United States Patent [19]

Cannon, Jr. et al.

[11] Patent Number: 4,634,214

[45] Date of Patent: Jan. 6, 1987

[54] OPTICAL FIBER CONNECTOR AND ARTICLE COMPRISING SAME

[75] Inventors: Thomas C. Cannon, Jr.; Arthur W. Carlisle, both of Dunwoody; Bruce V. Darden, Lawrenceville; Clyde J. Myers, Stone Mountain, all of Ga.

[73] Assignee: AT&T Bell Laboratories, Murray Hill, N.J.

[21] Appl. No.: 623,727

[22] Filed: Jun. 22, 1984

[51] Int. Cl.$^4$ .................................. G02B 6/36
[52] U.S. Cl. ............................. 350/96.20; 350/96.23
[58] Field of Search ............... 350/96.20, 96.21, 96.22, 350/96.23

[56] References Cited

U.S. PATENT DOCUMENTS

| | | | |
|---|---|---|---|
| 4,107,242 | 8/1978 | Runge | 264/1 |
| 4,140,365 | 2/1979 | Burger et al. | 350/96.20 |
| 4,221,461 | 9/1980 | Bair | 350/96.20 |
| 4,283,125 | 8/1981 | Borsuk | 350/96.20 |
| 4,362,356 | 12/1982 | Williams et al. | 350/96.20 |
| 4,398,793 | 8/1983 | Ohta et al. | 350/96.20 |
| 4,458,983 | 7/1984 | Roberts | 350/96.20 |

FOREIGN PATENT DOCUMENTS

| | | | |
|---|---|---|---|
| 59-15212 | 1/1984 | Japan | 350/96.20 |
| 2126368 | 3/1984 | United Kingdom | 350/96.21 |

OTHER PUBLICATIONS

*Optical Fiber Telecommunications*, 1979, S. E. Miller and A. G. Chynoweth, editors, pp. 483–497.

*Primary Examiner*—John Lee
*Attorney, Agent, or Firm*—Eugen E. Pacher

[57] ABSTRACT

An optical fiber connector comprising a fiber terminus piece with a longitudinal bore through which a bare fiber is inserted. The fiber terminus piece with an appropriately prepared fiber therein is held coaxially aligned with a mating terminus piece. The fiber terminus piece comprises, on its mating face, a "pedestal," typically having truncated-cone shape, extending outwardly from the plane of the face, with the fiber terminating within the face of the pedestal, whereby the area of potential contact between the mating terminus pieces is substantially reduced. The pedestal material advantageously is somewhat compliant, of compressive modulus between about $10^4$ and $10^6$ psi at 25° C., preferably between about $10^5$ and $5.10^5$ psi. The novel geometry results in improved performance, as compared to prior art connectors having flat mating faces. Disclosed are also connectors comprising advantageous means for transferring axial loads from a cable strength member to the connector body.

17 Claims, 7 Drawing Figures

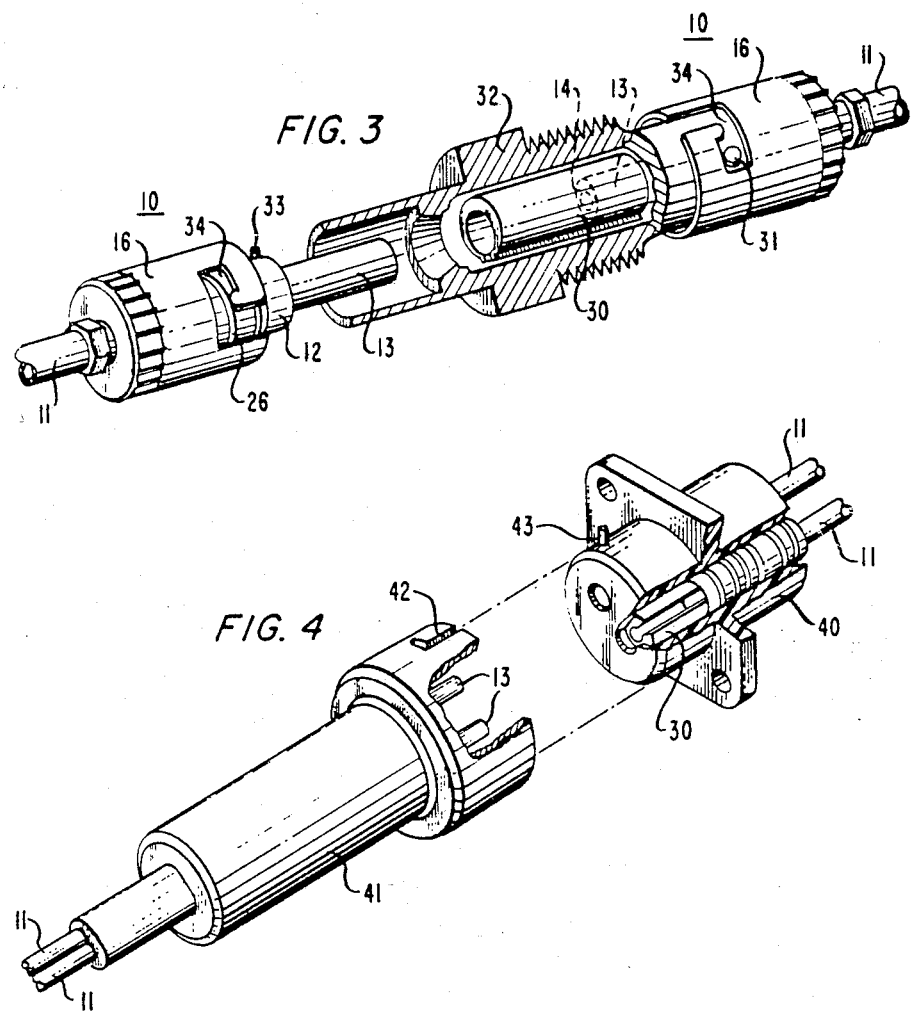
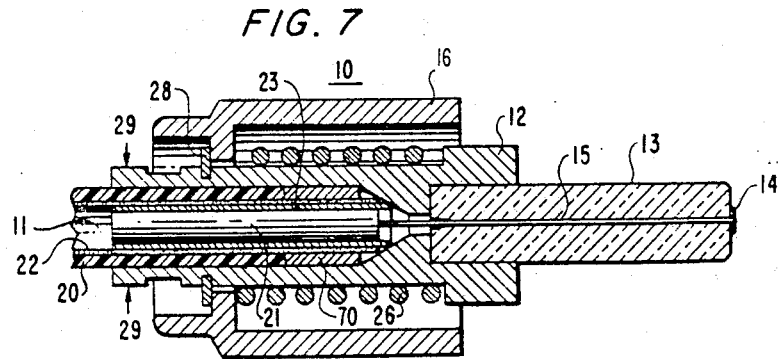

OPTICAL FIBER CONNECTOR AND ARTICLE COMPRISING SAME

FIELD OF THE INVENTION

This invention pertains to means for interconnecting optical fibers, and for connecting optical fiber to optical devices.

BACKGROUND OF THE INVENTION

Optical fiber connectors are used to optically couple one optical fiber to another optical fiber, or an optical fiber to optical devices such as LEDs, lasers or detectors. Such connectors form an essential part of substantially any optical fiber communications system, and the industry has expended a substantial effort on connector development.

The art knows a variety of connector types, including the so-called bi-conic connector (U.S. Pat. No. 4,107,242, co-assigned with this). For a discussion of optical fiber connectors, see, for instance, *Optical Fiber Telecommunication*, S. E. Miller and A. G. Chynoweth, editors, Academic Press (1979), especially pp. 483–497. One of the known connector types comprises two basically cylindrical fiber terminus pieces and mechanical means for maintaining the terminus pieces in substantially coaxial relationship, with the abutting surfaces of the terminus pieces substantially contacting. U.S. patent application Ser. No. 527,341, filed Aug. 29, 1983, and co-assigned with this, is an example of a connector of this type. Other examples are U.S. Pat. No. 4,140,365, and U.S. Pat. No. 4,283,125.

Connectors of this type, to be referred to herein as "ferrule-type" connectors, rely on the alignment of the outside surface of the terminus pieces to provide fiber alignment. For this approach to be satisfactory, it is obviously required that the fiber-receiving capillary bore of a terminus piece is concentric with the outer cylinder surface of the terminus piece. Furthermore, it requires that the optical fiber be flush with the mating end face of the terminus piece, and that the two mating end faces in a connector be normal to the fiber axis, to within quite close tolerances. Substantial deviations from these conditions tend to result in added signal loss. U.S. Pat. No. 4,221,461, co-assigned with this, discloses application of a compliant coating to the end face of a fiber terminus piece of a connector.

Not only does an optical fiber connector have to maintain the optical fiber ends coaxially aligned, it is also required to maintain the fiber ends in fixed longitudinal relationship, typically contacting or very nearly so, in the latter case often with some index-matching material between the fiber ends. This relationship has to be maintained for all rated longitudinal loads.

Optical fiber cables typically comprise strength members, e.g., KEVLAR (an aromatic polyimid) fibers, which are intended to be the primary load-bearing elements in case of longitudinal loading. Optical fiber connectors thus advantageously comprise means for transmitting longitudinal stress between the strength members of the joined optical cables. Such means are disclosed, for instance, in U.S. Pat. No. 4,283,125.

Other desirable characteristics of an optical fiber connector, including a connector of the ferrule-type, are simple construction and, therefore, low price, as well as small size, low loss, short assembly time, environmental stability, and versatility of design, e.g., adaptability of the basic design for simplex (one fiber) duplex (two fibers), or two or more fiber (multiplex) connectors. This application discloses a fiber connector possessing these desirable characteristics.

SUMMARY OF THE INVENTION

According to a principal aspect of the invention, there is provided an optical fiber connector adapted for being fixed to the end of at least one cabled optical fiber. Cabled fiber is generally enveloped by a sheath comprising an inner jacket, the sheath to be stripped, prior to fitting of the connector to the fiber, from a part of the fiber. The connector comprises a fiber termination comprising a (typically cylindrical) fiber terminus piece having a substantially straight longitudinal bore, adapted for receiving therein the stripped optical fiber, and a first end face. The connector further comprises means for maintaining the fiber terminus piece substantially coaxially aligned with an opposing terminus having a second end face. At least the first end face comprises a protrusion, referred to herein as a pedestal, the pedestal having an end face that is substantially normal to the fiber axis and an area that is substantially smaller than the cross-sectional area of the terminus piece. The presence of the pedestal, located such that the optical fiber emerges within the pedestal end face, reduces the potential area of contact between the fiber terminus piece and the opposing terminus piece. In a preferred embodiment of the invention, the pedestal consists substantially of somewhat compliant material, typically material having a modulus of compression between about $10^4$ and about $10^6$ psi at 25° C., preferably between $10^5$ and $5 \cdot 10^5$ psi. In typical fiber-to-fiber connectors according to the invention the opposing terminus piece also comprises a pedestal of the described type.

The terminus piece and the pedestal can be of different materials, e.g., ceramics and epoxy, respectively. In this case the pedestal, with the bore extending therethrough, can be preformed on the end face of the terminus piece. On the other hand, the pedestal can be formed during connector mounting by a molding technique, with the fiber to be inserted before curing of the pedestal material. The pedestal can also be an integral part of the terminus piece, of the same composition and formed at the same time the terminus piece is formed. Terminus pieces with an integral pedestal can, of course, be made from any suitable material, including filled thermoplastics.

A further principal aspect of the invention resides in the longitudinal load-transmitting means. The fiber connector comprises a connector body, and the sheath enveloping the fiber typically comprises, in addition to the inner jacket, at least one strength member, disposed outwardly of the inner jacket. The load-transmitting means comprise a tubular body that is adapted for being partially inserted into the end of the sheath, proximate to the strength member, and to be attached to the strength member and to the connector body by adhesive means, typically by means of thermosetting epoxy. This arrangement can produce a strong connection between the connector body and the cable strength member, in addition to preventing excessive wicking of epoxy. It also serves to position the cable during insertion of the fiber into the terminus piece.

Disclosed is also a connector according to the invention terminating an optical fiber cable comprising at least one sheathed optical fiber. Connectors according to the invention can be used advantageously with multimode optical fiber, but can, in principle, also be used with single mode fiber.

BRIEF DESCRIPTION OF THE DRAWINGS

FIG. 3 shows schematically, in partially cutaway view, a particular (simplex) embodiment of the inventive connector;

FIG. 4 similarly shows an exemplary duplex connector according to the invention;

FIG. 7 schematically depicts a further embodiment of the invention comprising an additional sleeve.

Like or analogous features in different Figures are denoted by like numerals.

DETAILED DESCRIPTION

Figure 1:
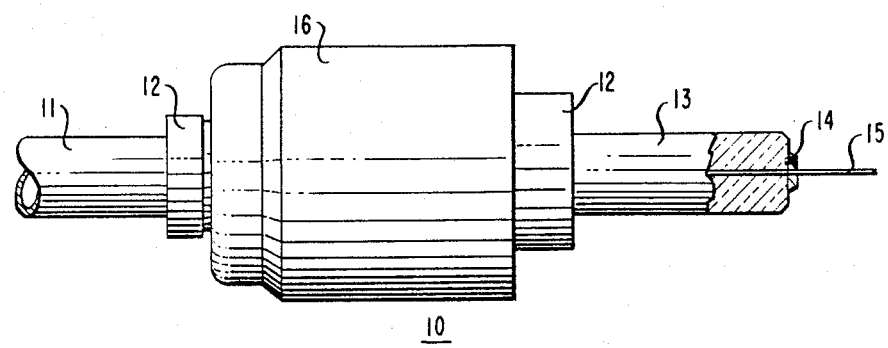
FIG. 1 schematically shows the outlines of a portion of a connector according to the invention attached to a fiber.

A principal aspect of the instant invention is a novel geometry of the mating faces of the fiber terminus pieces of a ferrule-type optical fiber connector. FIG. 1 shows a partially completed fiber termination which schematically illustrates this geometry. Fiber termination 10 is part of a complete ferrule-type connector. Sheathed fiber 11 enters connector body 12. Fiber terminus piece 13 is substantially rigidly attached to 12, and the stripped optical fiber is seen to have been threaded through the bore of 13 and to extend through pedestal 14 and beyond. Termination housing 16 partially encloses the connector body, as will be shown below in more detail.

A variety of materials are potentially suitable for use as terminus pieces, including drawn glass, metal (machined, or die-cast), metal with a plastic insert, transfer molded plastic (e.g., glass filled epoxy), injection molded plastic, and ceramic. We have found that ceramic fiber terminus pieces are rugged, can be relatively inexpensively produced to within close tolerances, and thus can be advantageously used in connectors according to the invention. However, transfer molded or injection molded plastic terminus pieces, especially such terminus pieces with pedestals integral therewith, can also advantageously be used in connectors according to the invention.

Typically, although not necessarily so, the pedestal has truncated-cone-shape and is coaxial with the bore of the terminus piece, as shown in FIG. 1. Typical dimensions of pedestals used by us are 0.020–0.050 inches diameter and about 0.010 inches height, with a relatively small cone angle, e.g., about 10°. Since terminus pieces used by us typically have a circular cross section and a diameter of about 0.1 inches, it is apparent that the pedestal end face area is substantially smaller than the cross-sectional area of the terminus piece, typically at least about 50% smaller.

It will be understood that the pedestal can consist of the same material as the terminus piece, or it can consist of different material, as indicated schematically in FIG. 1. An advantageous method for producing an epoxy pedestal on a preexisting (e.g., ceramic) terminus piece with flat end face will be described below.

The presence of at least one terminus piece with a pedestal in a ferrule-type connector, with the consequent reduction of potential contact area between the mating end faces of the two terminus pieces, typically results in improved connector performance. This is, inter alia, due to reduced sensitivity of connector performance to angular mismatch between the mating surfaces, to greater tolerance to movements caused by external loading of the connector, and to reduced sensitivity to particles inadvertently present in the interface. Furthermore, fiber end preparation, especially the polishing thereof, tends to be easier with the novel geometry, as compared to prior art flat end face geometry.

Although the above advantages can be achieved with pedestals of any appropriate material, we have found pedestals consisting of somewhat compliant materials, typically material having a room temperature modulus between about $10^4$–$10^6$ psi, preferably between $10^5$ and $5 \cdot 10^5$ psi, to be particularly advantageous. Such pedestals can absorb small angular mismatches, thereby providing closer contact between the fiber end faces, which can result in reduced transmission loss, even without use of index matching material. Furthermore, connectors utilizing compliant pedestals are still more tolerant to movements caused by external loading of the connector, and, if consisting of an easily worked material such as epoxy or other plastic material, can make fiber preparation still more easy.

Figure 2:
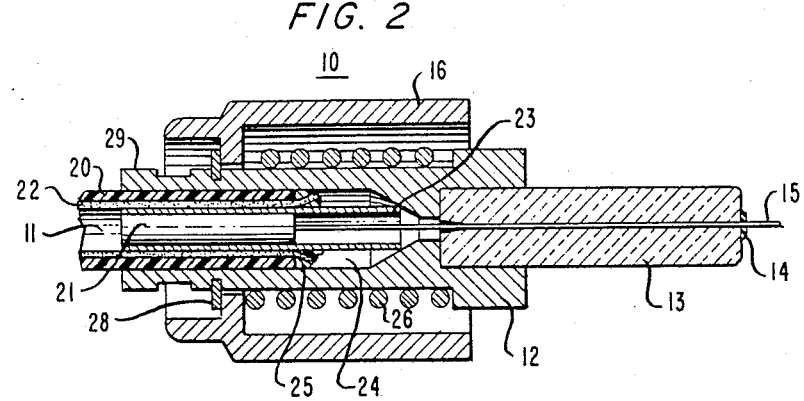
FIG. 2 depicts a cross-sectional view of a fiber termination portion of an exemplary connector according to the invention.

FIG. 2 shows a fiber termination 10 that forms part of a connector according to the invention. Sheathed fiber 11 comprises optical fiber 15, surrounded by inner jacket 21 (which can comprise one, two, or even more, different coating layers), which in turn is surrounded by fiber strength members 22, e.g., impregnated KEVLAR fibers, which in turn are enveloped by outer jacket 20. Optical fiber cables comprising sheathed fibers are well known in the art. The sheath is removed from a length of optical fiber, and sleeve 23 (advantageously a stainless steel tube) partially inserted between 21 and 22, with part of the sleeve extending beyond the fiber sheath. Fiber terminus piece 13 is held rigidly in connector body 12, by adhesive means or other appropriate means, e.g., a press fit. Termination housing 16 is held in place by retaining ring 28 and spring 26. Partially filling the empty space 24 between the connector body and the sleeve with epoxy 25 can result, after curing of the epoxy, in a relatively strong bond between the fiber sheath and the connector body. The adhesive, e.g., a thermosetting epoxy, typically is transported along the strength members by a wicking action, greatly increasing the bonding area between the sleeve member and the strength members.

Before insertion of the fiber assembly into the connector body, an adhesive, typically also thermosetting epoxy, is injected into the bore of the terminus piece, followed by threading the fiber through the bore, until the sheathed fiber assembly is positioned substantially as shown in the Figure. Lightly crimping the connector body in the region indicated by numerals 29 preliminarily secures the sheathed fiber in the connector body, and prevents wicking past the crimping region. Following curing of the epoxy, the fiber protruding from pedestal 14 is cut short by any appropriate means, e.g., scribing and breaking, and the fiber end prepared by polishing or other appropriate means. Means for fiber end preparation are well known in the art and need not be reviewed.

Figure 5:
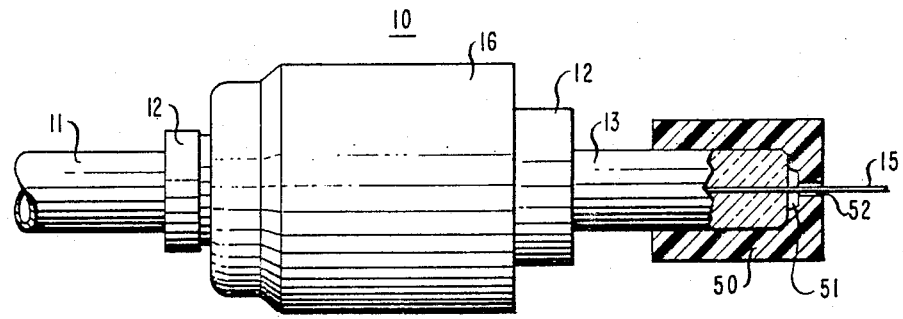
FIG. 5 schematically illustrates a preferred method for forming the pedestal on a preexisting fiber terminus piece.

FIG. 5 shows an advantageous method for forming a pedestal according to the invention. Prior to injection of epoxy into the bore of 13, a cap 50, typically a plastic cap, is slid over the end face of 13 and maintained thereon by means not shown. The cap contains a mold cavity 51 of a shape designed to yield a pedestal of the desired shape, and a bore 52 which permits passage of fiber 15. Sufficient epoxy (e.g., a polyamine- or catalytically-cured epoxy, neat, or filled to control, inter alia, viscosity, flow, expansion coefficient, or shrinkage) to fill the mold cavity is injected, e.g., by means of a syringe, through the bore of 13, followed by insertion of the fiber assembly into the connector body, substantially as described before. After curing of the epoxy, with cap 50 in place, the cap is removed, and the fiber end face prepared, substantially as described before.

FIG. 3 shows schematically an exemplary connector according to the invention. In particular, it shows a fiber-to-fiber connector, and more particularly still, a panel-mountable simplex fiber-to-fiber connector. The connector is seen to comprise two fiber terminations 10 of the type described previously, each comprising a fiber terminus piece 13 with a pedestal 14 thereon, a termination housing 16, spring 26 (only one of which is shown), and connector body 12. Alignment means 30 are contained within receptacle housing 32. The former is adapted to receiving therein fiber terminus pieces 13, and to maintain them therein in substantially coaxial relationship, by keeping aligned the outer cylinder surfaces of the two terminus pieces. Although our invention can be practiced with any suitable alignment means, e.g., a simple split metal sleeve, we find that particularly advantageous means are plastic split sleeves of the type disclosed in U.S. patent application Ser. No. 472,849, (now U.S. Pat. No. 4,541,685) co-assigned with this.

The receptacle body of the exemplary connector of FIG. 3 is panel mountable. Typically, after insertion of the threaded portion of 32 through an appropriate aperture in a chassis or panel, and securing 32 thereto by means of a nut, the properly terminated and prepared fiber ends are brought together by insertion of the terminus pieces into the sleeve 30, followed by locking in place of the respective fiber terminations by means of bayonet-type locking mechanisms comprising slots 34 in termination housings 16, and pins 31 projecting from the connector body. Since relative rotation between the mating pedestal surfaces can possibly result in damage to the fiber ends, it is advantageous to provide means for preventing such rotation. This can, for instance, be accomplished by means of keyway pin 33 projecting from the connector body 12, which is to be received in a keyway slot (not shown) in receptacle housing 32.

The invention cannot only be usefully employed in simplex connectors as described above, but can also be used in duplex or multiplex connectors, or in hybrid connectors such as (2×simplex)-to-duplex connectors.

A panel-mountable duplex connector is schematically illustrated in FIG. 4. The receptacle 40 of this male/female ferrule-type connector can be mounted on a panel by known means, and comprises two spaced apart fiber terminations contained within a common housing. In particular, two pedestal-bearing fiber terminus pieces are inserted into sleeves 30. The plug assembly 41 also comprises two fiber terminus pieces 13, positioned such as to be insertable into the spaced apart sleeves. Bayonet-type locking means comprising slot 42 and pin 43 serve to secure the plug assembly to the receptacle assembly.

Figure 6:
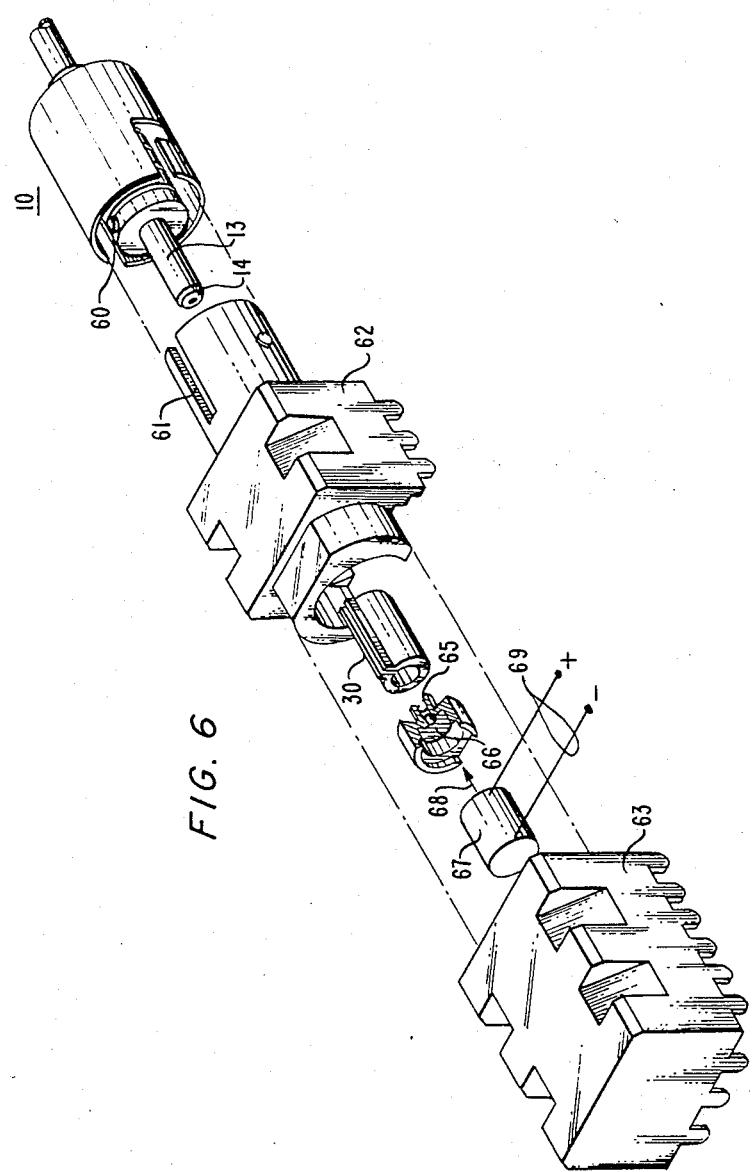
FIG. 6 schematically depicts a further embodiment of the invention, namely, means for coupling optical fiber to an optical device.

It will be evident to those skilled in the art that the invention can be embodied in a variety of fiber-to-fiber connectors, and no attempt will be made to describe all possible such embodiments. In addition to being useful in fiber-to-fiber connectors, the invention can also usefully be applied in optical-device-to-fiber connectors. Such a connector is schematically illustrated in FIG. 6. The optical package 67, which is shown schematically as a functional unit, comprises typically a light source or a detector, and can comprise electronics to power the source or detector, transform and/or condition signals, or perform other necessary functions well known to those skilled in the art. The optical package 67, which is shown displaced from the optical axis of the connector for clarity only, is shown to emit radiation 68, and to have electrical terminals 69, by means of which the package can be powered. 67 is inserted into lens housing 64, terminus piece 65 of 64 inserted into alignment sleeve 30, and the device package completed by placing the described assembly into housing 62 and joining cover 63 to the housing. The device package can then be mounted on an appropriate chip carrier or circuit board, or be incorporated into equipment by any other appropriate means.

To the device package an optical fiber is connected by preparing fiber termination 10, comprising terminus piece 13 and pedestal 14, substantially as described before, inserting 13 into 30 such that pedestal 14 contacts the end face of lens housing 64 (or is in the close proximity thereto), and securing 10 to 62, e.g., by means of a bayonet-type mechanism. Keyway pin 60 and keyway slot 61 prevent relative rotation between terminus piece 14 and lens housing 64. Radiation 68, emitted from a source in 67, is focused onto the fiber end face by means of lens 66.

FIG. 7 shows a variation of the connector that was illustrated in FIG. 2 and discussed in detail above. The discussion applies substantially also to FIG. 7 and will therefore not be repeated here. The connector of FIG. 7 comprises an outer sleeve 70 that serves to confine fiber strength members 22 between inner sleeve 23 and outer sleeve 70. This arrangement can result in particularly strong bonds between the connector body and the fiber sheath.

In particular, outer jacket 20 typically is cut back somewhat further than fiber strength members 22 and inner jacket 21, to provide space for outer sleeve 70. The thus exposed fiber strength members are wetted with adhesive, typically heat curable epoxy, and the outer sleeve placed around the strength members. The outer sleeve advantageously is formed from a U-shaped metal part which can be bent in situ into substantially tubular shape. For instance, we have found 20 mil thick aluminum stock to serve well. Before insertion of the fiber into the connector body, epoxy is injected into the bore of terminus piece 13. After wetting the outside of 70 with epoxy, the thus prepared fiber assembly is inserted into the connector body, with the fiber inserted into the bore of 13, and the connector body lightly crimped in region 29, thereby temporarily securing the sheathed fiber to the connector body. Curing of the termination assembly can result in formation of strong adhesive bonds between inner sleeve 23 and strength members 22, between strength members 22 and outer sleeve 70, and between the latter and the connector body. After preparation of the fiber protruding from the pedestal, as already described, the connector can be used, for instance, in a connection of the type shown in FIG. 3.

It is to be understood that the foregoing descriptions of specific embodiments of the invention are by way of example only, and are not to be considered as a limitation on the scope of the invention.

What is claimed is:

1. An optical fiber connector comprising a fiber termination adapted for being fitted to the end of at least one optical fiber, the optical fiber extending from the end of a sheath comprising an inner jacket and at least one strength member disposed outwardly of the inner jacket, the fiber termination comprising a connector body and means for transmitting an axial load between the strength member and the connector body
   characterized in that
   the load-transmitting means comprise a tubular body adapted for being inserted at least in part into the end of the sheath, enclosing the inner jacket and contacting the strength member, and to be attached to the strength member and to the connector body by adhesive means.

2. Connector of claim 1, wherein the tubular body is a substantially cylindrical metal tube, to be referred to as the inner sleeve.

3. Connector of claim 2, wherein the inner sleeve is inserted between the inner jacket and the strength member and such that the inner sleeve extends further in the direction of the fiber end to be connected than does the strength member.

4. Connector of claim 1, wherein the strength member comprises a multiplicity of polymer fibers.

5. A ferrule-type optical fiber connector comprising
   (a) at least one substantially cylindrical fiber terminus piece having a longitudinal bore adapted for receiving therein an uncoated end portion of an optical fiber, an outer cylinder surface, a diameter, and a first end face; and
   (b) means, acting on the outer cylinder surface, for maintaining the fiber terminus piece in substantially coaxial relationship with an opposing member;
   characterized in that
   (c) the fiber terminus piece comprises, at least after fitting of the fiber terminus piece to the uncoated end portion of the optical fiber, a pedestal projecting from the first end face, with the longitudinal bore extending through the pedestal, the pedestal consisting substantially of material having a modulus of compression between about $10^4$ and about $10^6$ psi at 25° C., the pedestal having a pedestal end face that is substantially parallel with the first end face and having a diameter that is smaller than the terminus piece diameter, and also having a height that is less than the pedestal end face diameter;
   (d) the uncoated end portion of the optical fiber extending through the bore in the pedestal, with the end of the optical fiber being substantially flush with the pedestal end face; and
   (e) the uncoated end portion of the optical fiber being held in the bore of the terminus piece by adhesive means.

6. Connector of claim 5, wherein the pedestal is formed, during the process of fitting the terminus piece to the optical fiber, by a procedure comprising surrounding at least part of the fiber terminus piece with a mold, injecting a curable material into the mold, and curing the curable material.

7. Connector of claim 6, wherein the curable material is an epoxy.

8. Connector of claim 5, wherein the fiber terminus piece comprises the pedestal prior to the fitting of the fiber terminus piece to the optical fiber.

9. Connector of claim 8, wherein the pedestal consists of material having substantially the same composition as the fiber terminus piece material.

10. Connector of claim 9, wherein the fiber terminus piece consists substantially of a filled thermoplastic.

11. Connector of claim 5, wherein the opposing member is a fiber terminus piece.

12. Connector of claim 5, wherein the opposing member is at least a part of means for coupling an optical device to an optical fiber.

13. Connector of claim 5, wherein the connector is a multiplex connector adapted for connecting a plurality of individual optical fibers, each fitted with a fiber terminus piece, to a plurality of optical fibers or to a plurality of optical devices, each fiber terminus piece having an end face with a pedestal thereon.

14. Optical fiber connector of claim 5, wherein the optical fiber extends from the end of a sheath comprising an inner jacket, at least one strength member disposed outwardly of the inner jacket, and an outer jacket enclosing the strength member, the fiber termination further comprising a connector body and means for transmitting an axially directed load between the strength member and the connector body, the connector further
   characterized in that
   the load-transmitting means comprise a tubular body adapted for being inserted at least in part into the end of the sheath, enclosing the inner jacket and contacting the strength member, and being attached to the strength member and to the connector body by adhesive means.

15. Connector of claim 14, wherein the tubular body is a metal sleeve, to be referred to as the inner sleeve, inserted between the inner jacket and the strength member, and the connector further comprises an outer sleeve substantially surrounding, and proximate to, a length of the strength member extending further towards the fiber terminus piece than the outer jacket, whereby the length of the strength member is confined between the inner sleeve and the outer sleeve, the strength member being attached by means comprising adhesive means to the inner sleeve and the outer sleeve, at least the outer sleeve being attached by means comprising adhesive means to the connector body.

16. In combination, an optical fiber cable comprising at least one coated optical fiber, and optical fiber termination means fitted to an uncoated end portion of the optical fiber, the fiber termination means comprising
   (a) at least one substantially cylindrical fiber terminus piece having a longitudinal bore, an outer cylinder surface, a diameter, and a first end face, the uncoated end portion of the optical fiber inserted into the bore and held therein; and
   (b) means, acting on the outer cylinder surface, for maintaining the fiber terminus piece in substantially coaxial relationship with an opposing member;
   characterized in that
   (c) the fiber terminus piece comprises a pedestal projecting from the first end face, with the longitudinal bore extending through the pedestal, the pedestal consisting substantially of material having a modulus of compression between about $10^4$ and about $10^6$ psi at 25° C., the pedestal having a pedestal end face that is substantially parallel with the first end face and having a diameter that is smaller than the terminus piece diameter, and also having a height that is less than the pedestal end face diameter;

(d) the uncoated end portion of the optical fiber extending through the bore in the pedestal, with the end of the optical fiber substantially flush with the pedestal end face; and (e) the uncoated end portion of the optical fiber being held in the bore of the terminus piece by adhesive means.

17. Combination of claim 16, wherein the optical fiber cable comprises at least one strength member disposed outwardly of the coated optical fiber, the fiber termination means comprising a connector body and means for transmitting an axial load between the strength member and the connector body, further characterized in that the load-transmitting means comprise a tubular body inserted at least in part into the end of the optical fiber cable such that the tubular body encloses the coated optical fiber and contacts the strength member, and is attached to the strength member and to the connector body by adhesive means.

* * * * *